J. MANNING, Sr.
TRAP.
APPLICATION FILED MAR. 5, 1920.
1,356,775.
Patented Oct. 26, 1920.
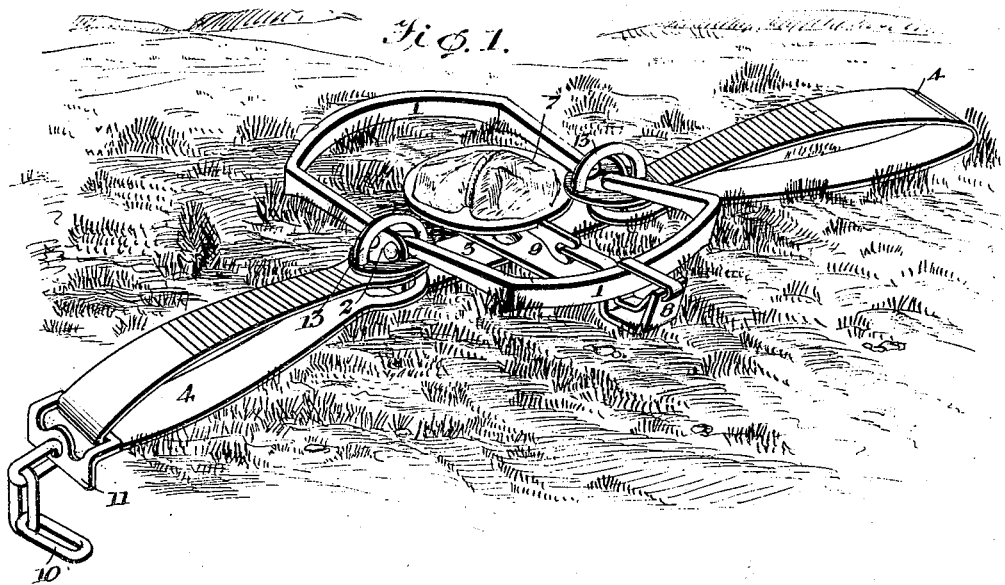
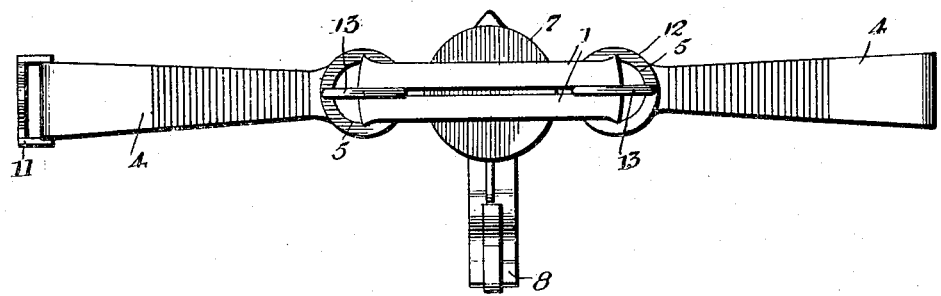
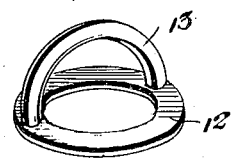
WITNESSES
INVENTOR
J. Manning, Sr.,
BY
ATTORNEYS

UNITED STATES PATENT OFFICE.

JAMES MANNING, SR., OF MARATHON, TEXAS.

TRAP.

1,356,775.   Specification of Letters Patent.   Patented Oct. 26, 1920.

Application filed March 5, 1920. Serial No. 363,427.

*To all whom it may concern:*

Be it known that I, JAMES MANNING, Sr., a citizen of the United States, and a resident of Marathon, in the county of Brewster and State of Texas, have invented certain new and useful Improvements in Traps, of which the following is a specification.

My invention is an improvement in traps, and has for its object to provide mechanism in connection with spring traps, which is controlled by the closing of the trap, for sweeping the jaws free from obstruction which might hinder the proper closing of the jaws and for spacing the jaws, when closed, slightly, so that the bones of the leg of the animal caught in the trap will not be crushed.

In the drawings:

Figure 1 is a perspective view of the improved trap in set condition;

Fig. 2 is a top view of the trap sprung;

Fig. 3 is a perspective view of the attachment for sweeping the jaws free from obstruction.

The present embodiment of the invention is shown in connection with a trap consisting of similar jaws 1, which are hinged to the upstanding arms 2 of the yoke shaped base 3 to swing into the same plane in set condition or into engaging position to grasp the animal. Substantially U-shaped springs 4 are engaged with the arms 2 of the yoke, beneath the pivotal connection of the jaws, each arm of each spring having an opening 5 through which the arm of the yoke extends.

A bait pan 7 is arranged at the center of the base, the said bait pan being connected with the usual trigger mechanism indicated generally at 8 for holding the jaws set until the bait pan, with the bait thereon, is depressed. This trigger mechanism is mounted on a laterally extending arm 9 from the body of the yoke and is of usual construction. A chain 10 is connected with one of the U-shaped springs by means of a loop 11 of metal, which engages the body of the spring and to which a link of the chain is connected.

In setting the trap, the feet of the trapper are placed on the upper members of the U-shaped springs, and it will be noticed that the upper members are corrugated or roughened to prevent slipping of the feet. The upper members of the springs are pressed downwardly, until the jaws 1 can be swung outwardly away from each other and into approximately the same plane. One of the jaws is engaged by the trigger mechanism and the trap is held set until the bait pan is disturbed by the animal. This releases the trigger mechanism and the jaws swing together upon the animal.

As is known, it frequently happens that obstructions obtaining place between the jaws hold the jaws from closing tightly on the animal, thus permitting the animal to escape. Such obstructions may find place on the trap accidentally or they may be placed there to conceal the trap, as, for instance, leaves, grass and the like. In order to free the jaws from obstruction in advance of their closing action, I arrange upon each yoke arm 2, just above the upper member of the spring 4, a ring 12. Each of these rings has an arc shaped bar 13 arranged diametrically thereof, on its upper face, the bar arching upwardly over the plane of the rings. The rings are so arranged that the bars 13 are between the jaws. With this arrangement, when the trap is sprung, the rings will be forced upwardly by the upward movement of the upper members of the spring 4, with the bar 13 between the jaws, and the said bars will move from top to bottom of the jaws.

The jaws, as shown, are U-shaped, the arms being pivoted to the yoke arms, with the bodies lying substantially parallel with the body of the yoke, the bars 13 will move from the pivotal connection of the jaws to the bodies of the jaws, clearing the jaws from any obstructions that may be between them. The bars will also space the jaws slightly apart, as shown in Fig. 2, so that the bone of the leg of the animal will not be crushed nor the tendons severed, to permit the animal to escape by leaving his leg in the trap.

I claim:

1. In combination with a spring trap comprising a base having at each end an upstanding lug, U-shaped jaws comprising bodies and arms hinged to the lugs to swing into the same plane or toward each other, U-springs normally operative to swing the jaws toward each other, and washers mounted on the lugs above the U-springs and riding up the arms of the jaws when they swing together, each washer having connected therewith an arc shaped cross bar extending between the jaws.

2. In combination with a spring trap comprising a base having at each end an upstanding lug, U-shaped jaws comprising bodies and arms hinged to the lugs to swing into the same plane or toward each other, U-springs normally operative to swing the jaws toward each other, and washers mounted on the lugs above the U-springs and riding up the arms of the jaws when they swing together, each washer having connected therewith a cross bar extending between the arms of the jaws for the purpose specified.

3. In a spring trap, the combination with the jaws and the springs for closing the jaws, of means controlled by the expansion of the spring and moving between the jaws for clearing obstructions from between the jaws prior to the closing thereof, and limited in their movement with respect to the jaws to a position such that they will be between the jaws when they are closed.

4. In a spring trap, the combination with the jaws and the springs for closing the jaws, of means controlled by the expansion of the spring and moving between the jaws for clearing obstructions from between the jaws prior to the closing thereof, said means comprising washers encircling the adjacent arms of the jaws and riding up said arms when the jaws are closed, each washer having a cross bar between the jaws.

5. In a spring trap, the combination with the jaws and the springs for closing the jaws, of means controlled by the expansion of the spring and moving between the jaws for clearing obstructions from between the jaws prior to the closing thereof.

JAMES MANNING, Sr.